(12) United States Patent
Junod

(10) Patent No.: US 8,157,503 B2
(45) Date of Patent: Apr. 17, 2012

(54) THERMAL MANAGEMENT SYSTEM

(75) Inventor: Larry Allen Junod, Greencastle, IN (US)

(73) Assignee: Rolls Royce Corporation, Indianapolis, IN (US)

( * ) Notice: Subject to any disclaimer, the term of this patent is extended or adjusted under 35 U.S.C. 154(b) by 696 days.

(21) Appl. No.: 12/284,391

(22) Filed: Sep. 22, 2008

(65) Prior Publication Data

US 2010/0074736 A1  Mar. 25, 2010

(51) Int. Cl.
*F01D 25/08* (2006.01)
*F04D 29/58* (2006.01)

(52) U.S. Cl. .......................... 415/114; 415/116; 60/730

(58) Field of Classification Search ................ 415/114, 415/115, 116; 60/730, 736, 806
See application file for complete search history.

(56) References Cited

U.S. PATENT DOCUMENTS

| | | | |
|---|---|---|---|
| 4,351,150 A | 9/1982 | Schulze | |
| 4,474,001 A | 10/1984 | Griffin et al. | |
| 5,351,476 A | 10/1994 | Laborie et al. | |
| 5,655,359 A | 8/1997 | Campbell et al. | |
| 5,987,877 A | 11/1999 | Steiner | |
| 6,282,881 B1 | 9/2001 | Beutin et al. | |
| 6,397,577 B1 | 6/2002 | Sondergaard | |
| 6,442,930 B1 * | 9/2002 | Johnson et al. | 60/226.1 |
| 6,550,235 B2 * | 4/2003 | Johnson et al. | 60/204 |
| 6,584,778 B1 * | 7/2003 | Griffiths et al. | 60/782 |
| 6,651,929 B2 * | 11/2003 | Dionne | 244/57 |
| 6,666,018 B2 * | 12/2003 | Butler et al. | 60/226.1 |
| 6,931,834 B2 * | 8/2005 | Jones | 60/226.1 |
| 6,939,392 B2 | 9/2005 | Huang et al. | |
| 6,942,181 B2 * | 9/2005 | Dionne | 244/57 |
| 2006/0078034 A1 | 4/2006 | Coffinberry | |
| 2007/0051233 A1 | 3/2007 | Duge | |
| 2007/0126292 A1 | 6/2007 | Lugg | |

FOREIGN PATENT DOCUMENTS

| | | |
|---|---|---|
| EP | 146487 A1 | 6/1985 |
| EP | 1018468 A1 | 7/2000 |
| WO | WO 2004/054342 A2 | 6/2004 |

OTHER PUBLICATIONS

International Search Report and Written Opinion, PCT/US09/57326, Rolls-Royce Corporation, Jan. 22, 2010.
Supplementary European Search Report, EP 09815197, Jan. 23, 2012, Rolls-Royce Corporation.

* cited by examiner

*Primary Examiner* — David Nhu
(74) *Attorney, Agent, or Firm* — Krieg DeVault LLP

(57) ABSTRACT

In one embodiment a gas turbine engine is disclosed having a heat exchanger at least partially disposed in a bypass duct. In one form the gas turbine engine is a high bypass ratio engine. The heat exchanger may be coupled with a directed energy weapon to provide coolant flow and regulate the temperature of the directed energy weapon. Other devices may also be coupled with the heat exchanger, either as an alternative to in addition to the directed energy weapon.

20 Claims, 3 Drawing Sheets

THERMAL MANAGEMENT SYSTEM

TECHNICAL FIELD

The present application generally relates to heat exchange systems, and more particularly, but not exclusively, to gas turbine integrated heat exchangers.

BACKGROUND

Effective heat transfer remains an area of significant interest for heat producing components used in conjunction with gas turbine engine energy production and/or propulsion. Some existing systems have certain shortcomings. Accordingly, there remains a need for further contributions in this area of technology.

SUMMARY

One embodiment of the present application is a unique heat transfer technique for a gas turbine engine. Other embodiments include unique apparatus, systems, devices, hardware, and methods for heat transfer systems. Further embodiments, forms, objects, features, advantages, aspects, and benefits of the present invention shall become apparent from the following description and drawings.

DETAILED DESCRIPTION

Figure 1:
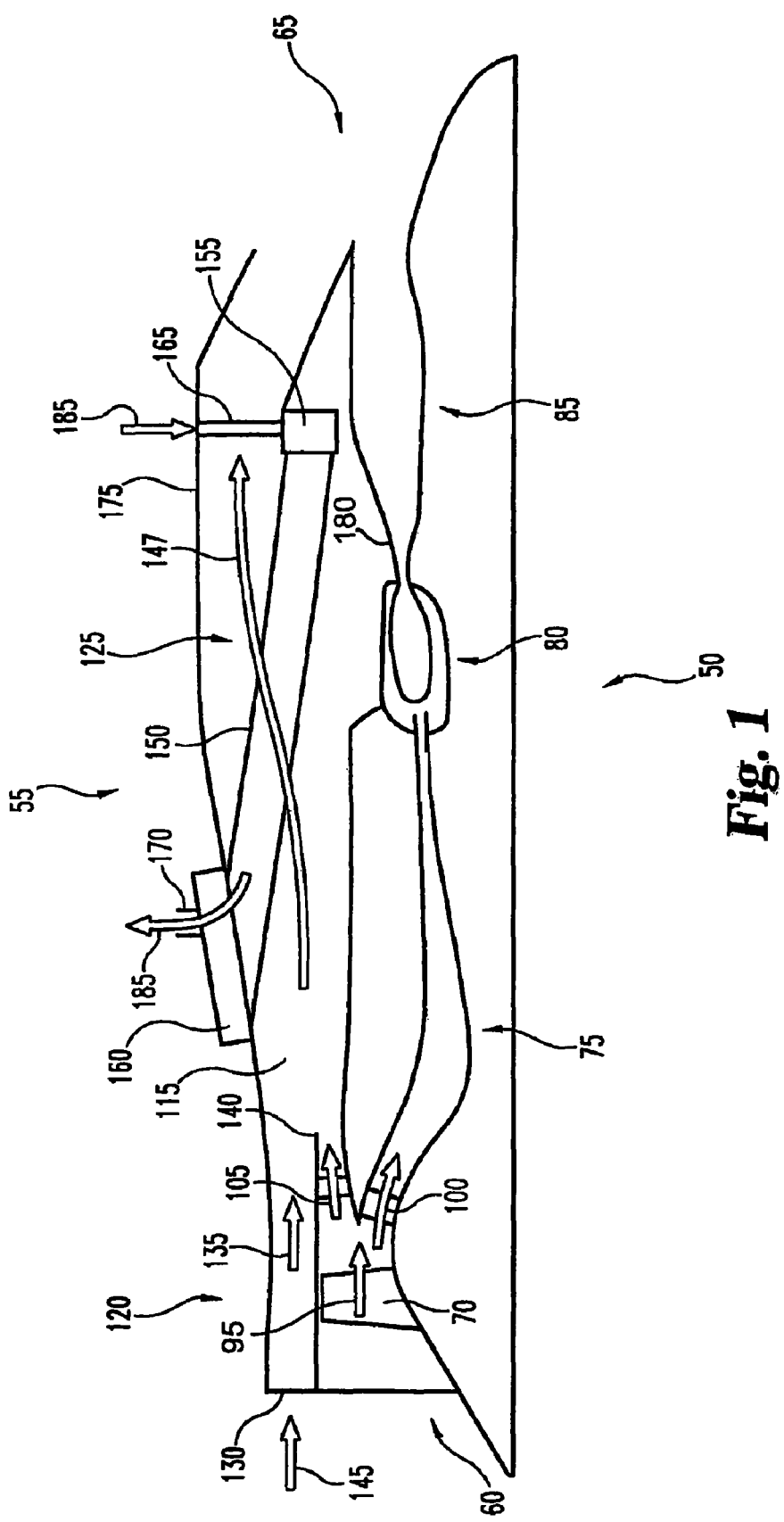
FIG. 1 is a side view of one arrangement of a gas turbine engine with a heat exchange system.

For purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described device, and any further applications of the principles described herein are contemplated as would normally occur to one skilled in the art to with the invention relates.

FIG. 1 illustrates a gas turbine engine 50 having a heat exchange system 55 that embodies one form of the present invention. The gas turbine engine 50 provides energy as part of an electrical generator set in some forms, and/or in other forms may provide power to an aircraft. As used herein, the term "aircraft" includes, but is not limited to, helicopters, airplanes, unmanned space vehicles, fixed wing vehicles, variable wing vehicles, rotary wing vehicles, hover crafts, and other airborne and/or extraterrestrial vehicles. Further, the present inventions are contemplated for utilization in other applications that may not be coupled with an aircraft such as, for example, industrial applications, power generation, pumping sets, naval propulsion weapons systems, security systems, perimeter defense/security systems, and the like known to one of ordinary skill in the art.

The gas turbine engine 50 operates by receiving working fluid through an inlet 60 of the gas turbine engine 50 and discharging working fluid through an outlet 65, which typically includes combustion exhaust gases and air. The working fluid entering through inlet 60 is typically air. The gas turbine engine of the illustrative embodiment is a turbofan engine that includes a fan 70, a compressor 75, a combustor 80, and a turbine 85. In other embodiments, however, the gas turbine engine 50 may take on other forms, such as, but not limited to, turboprop, turbojet, etc. Airflow entering the inlet 60 of the gas turbine engine 50 is accelerated and compressed by the fan 70 which produces a fan flow stream 95. The fan flow stream is split and becomes a core flow 100 and a bypass flow 105. The core flow 100 flows from the fan 70 and through the compressor 75, the combustor 80, and the turbine 85 before exiting at the outlet 65 of the gas turbine engine 50. As airflow traverses gas turbine engine 50 the core flow 100 it is expanded through the turbine 85 thereby creating mechanical work to drive the fan 70 and the compressor 75. The bypass flow 105 traverses from the fan 70 through a bypass duct 115 thereby bypassing the core of the gas turbine engine 50 before exhausting at the outlet 65. The bypass flow 105 can be created by any type of bladed rotor operable to increase the pressure of the airflow, whether the bladed rotor is a fan 70 as depicted in the illustrative embodiment, or a compressor as depicted further below. Airflow flowing through any of the flow paths may be used to provide thrust for an aircraft and/or cooling for a relatively high temperature component, to set forth just two non-limiting examples. Suitable flow paths include the core flow path, the bypass flow path, or any other flow path provided by the gas turbine engine.

The heat exchange system 55 is incorporated with the gas turbine engine 50, and in one form includes an ejector 120 and a heat exchanger 125. In some applications, the gas turbine engine 50 may be an existing gen-set or aircraft power plant which is retrofitted to include the heat exchange system 55. The heat exchange system 55 is used to transfer heat from at least one portion of a heat producing component into a media at cooler temperatures. In one non-limiting example, the heat producing component is a directed energy weapon. The heat exchange system 55 may be configured to operate at a variety of temperatures and pressures. To set forth just a few non-limiting examples, the heat exchange system 55 may be used to accommodate different operating conditions or unique needs of different heat producing components.

In one form, the ejector 120 of the heat exchange system 55 includes an ejector inlet 130, an ejector flow path 135, and a mixer 140. In one form the ejector inlet 130 is formed in the inlet 60 of the gas turbine engine 50 and is sized to capture an ambient airflow 145. In some embodiments, the ejector inlet 130 is integrally formed in the inlet 60 of the gas turbine engine 50, but in other embodiments the ejector inlet 130 is a separately formed construction that is added/retrofitted to a pre-existing engine. In still other embodiments, the ejector inlet 130 is positioned at locations other than the inlet 60.

The ejector flow path 135 extends from the ejector inlet 130 in the illustrative embodiment and is configured to convey the ambient airflow 145 to the bypass duct 115 by means of a fluid pump described below. In one form, the ejector flow path 135 extends axially from the ejector inlet 130 and occupies a circumferential area of the inlet 60, but in other forms the flow path takes on any variety of configurations. In still other forms, the ejector flow path 135 occupies substantially the entire circumferential distance around the inlet 60, or just a portion thereof.

The mixer 140 is oriented at the downstream end of the ejector flow path 135 in the illustrative embodiment, and is configured to intermix the ambient airflow 145 traversing the ejector flow path 135 with the fan flow stream 95 downstream of the fan 70. A mixed airflow 147, which results from mixing the ambient airflow 145 with the fan flow stream 95, traverses through the bypass duct 115. The mixer 140 may have a variety of configurations useful for mixing the ambient airflow 145 with the fan flow stream 95, including vertical flow generators and swirled lobed mixers, to set forth just two non-limiting examples. In some embodiments, the ejector 120 includes a mixer 140 having plain features such as that depicted in the illustrative embodiment. In such embodiments, airflow entrained through ejector may be mixed through shearing action with airflow traversing through the bypass flow path.

In the illustrative embodiment, the heat exchanger 125 includes a heat exchange member 150, an intake manifold 155, an exit manifold 160, and heat exchanger conduits 165 and 170. In other embodiments, the heat exchanger 125 may include fewer components or additional components. In one form the heat exchange member 150 may operate as part of a refrigerant circuit. For example, the heat exchange member 150 can take the form of a condenser or evaporator, to set forth just two non-limiting examples.

The heat exchange member 150 is configured to convey a heat exchange fluid 185 and may do so through a variety of internal passageways (not shown). In one form the heat exchange member 150 includes at least one surface or portion that is in thermal contact with the bypass duct 115 of the gas turbine engine 50. In one form, the heat exchange member is configured to extend across the bypass duct 115 from an upstream position in a case side 175 to a downstream position in a core side 180, but other configurations are also contemplated herein. For example, the heat exchanger 125 can be substantially disposed within either the case side 175 or the core side 180, or can be disposed from a downstream position in the case side 175 to an upstream position in the core side 180. In the illustrative embodiment, the heat exchange member 150 is configured to convey the heat exchange fluid 185 from a downstream position at the intake manifold 155 to an upstream position at the exit manifold 160. In other embodiments, however, the heat exchange fluid 185 flows from an upstream position to a downstream position. In still further embodiments, the heat exchange member 150 is a passive heat exchanger such that the heat exchange fluid 185 may not be needed.

In one form of operation, heat is transferred from a relatively high temperature heat exchange fluid 185 to the mixed airflow 147. Heat exchange rates will generally vary depending on the relative temperature difference between the heat exchange fluid 185 and the mixed airflow 147, the flow rates of the heat exchange fluid 185 and the mixed airflow 147, as well as the outer geometry of the heat exchanger 125, to mention just a few variables that may affect heating exchange rates. In one embodiment the heat exchange member 150 includes radiator fins or other similar device(s) to provide higher heat transfer rates. As referred to above, in some embodiments, the heat exchange member is a solid heat sink that is in thermal contact with a heat producing component, thus eliminating the need to circulate the heat exchange fluid 185.

In one form the intake manifold 155 is used to receive the heat exchange fluid 185 returning from a heat producing component through the heat exchanger conduit 165, and thereafter deliver the heat exchange fluid 185 to the heat exchange member 150. The intake manifold 155 can be configured to accept one stream or multiple streams of the heat exchange fluid from multiple heat exchange components. In some embodiments, the heat exchanger 125 does not include intake manifold 155, rather, the heat exchange fluid 185 returning from a heat producing component flows directly into the heat exchange member 150.

The exit manifold 160 may be configured to receive a relatively cool heat exchange fluid 185 and distribute it to a heat producing component. The exit manifold 160 may be configured to return the heat exchange fluid to one or multiple heat producing components. In some embodiments, the heat exchanger 125 does not include the exit manifold 160, rather, the heat exchange fluid 185 flows directly from the heat exchange member 150 to a heat producing component.

The heat exchanger conduits 165 and 170 are configured to convey the heat exchange fluid 185 to and from a heat producing component (not shown). The heat exchanger conduits 165 and 170 may include single or multiple conduits. In some non-limiting forms, the multiple conduits may be routed to and from multiple heat producing components, the conduits may be used to deliver the heat exchange fluid to multiple locations within a single heat producing component, or may be used in any other type of distraction scheme, or any type of a combination. In other embodiments, the heat exchanger conduits 165 and/or 170 have sectors that correspond to different sources and/or destinations of the heat exchange fluid 185. In one non-limiting example, multiple conduits are combined to form a single sectorized conduit.

One implementation of the present application includes a heat exchange fluid that is used to cool a heat producing component, such as a directed energy weapon system that is coupled to a gas turbine engine. The heat exchange fluid flows from a relatively high temperature heat exchange component, through a heat exchange conduit, and into a heat exchange member which is exposed to an airflow at a relatively cool temperature. The airflow can include ambient air and fan bypass air and preferably is at a lower temperature than the heat exchange fluid. The ambient air or other suitable air source can be entrained with the fan bypass air through the action of a fluid pump in the form of an ejector formed in the inlet of the gas turbine engine. Once the heat exchange fluid has been cooled by the heat exchange member, it is returned to the relatively high temperature heat producing component.

Figure 2:
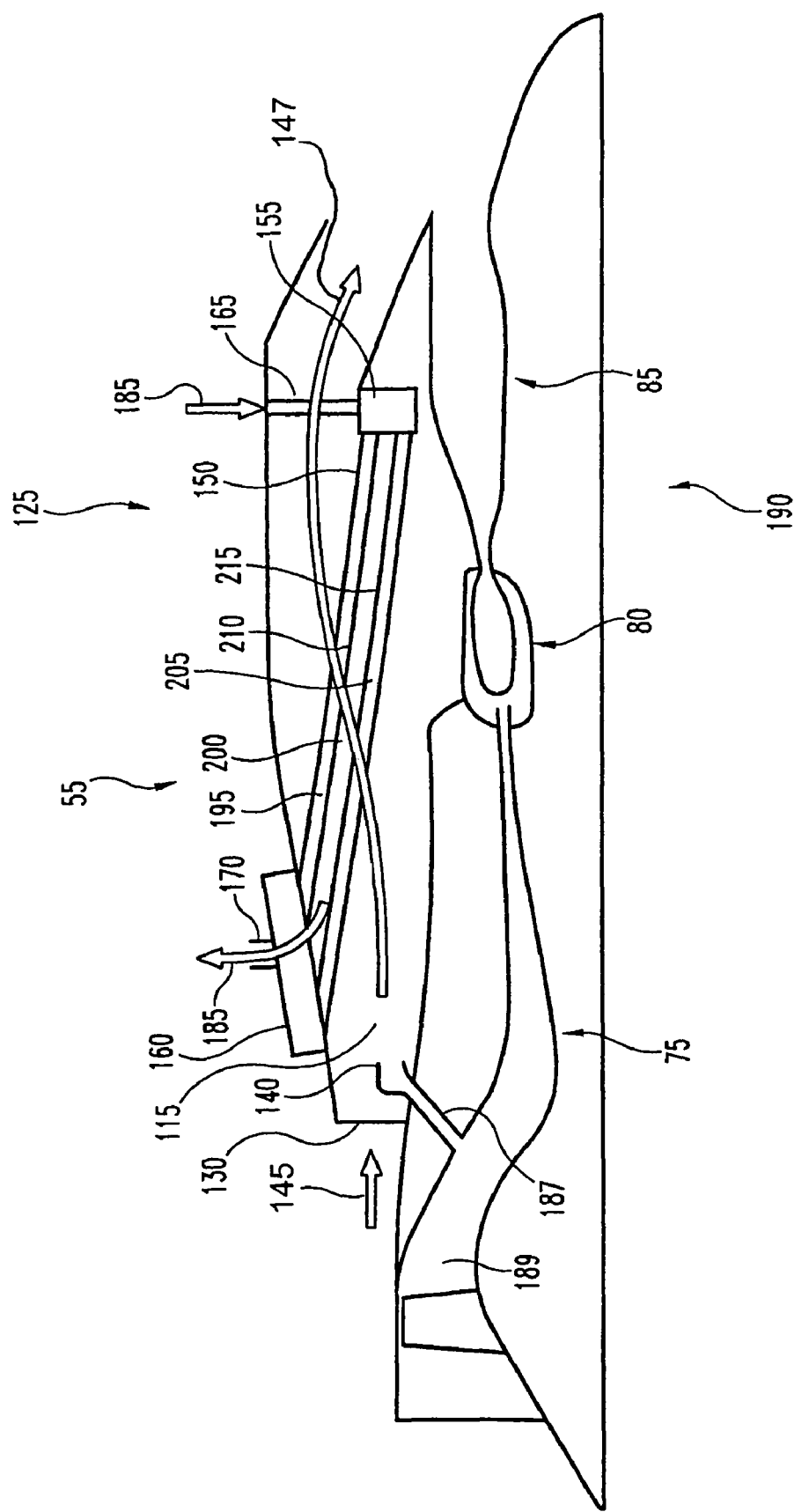
FIG. 2 is a side view of another arrangement of a gas turbine engine with a heat exchange system.

Referring to FIG. 2, another embodiment of the present invention is depicted. A turbojet engine 190 in the illustrative embodiment includes the heat exchange system 55 and a compressed air pathway 187. The compressed air pathway 187 extends from a core flow path 189 to the bypass duct 115 and is configured to supply a compressed airflow at relatively high velocity. An ejector may be formed when the compressed airflow enters the bypass duct 115, thereby pumping the ambient airflow 145 into the bypass duct 115 to create the mixed airflow 147. The mixer 140 may be configured to mix the ambient airflow 145 with airflow from the compressed air pathway 187. Although engine 190 is depicted as a turbojet, other types of gas turbine engines having a compressed air pathway 187 are also contemplated herein.

For this illustrative embodiment, the heat exchanger 125 includes the heat exchange member 150, the intake manifold 155, the exit manifold 160, and the heat exchanger conduits 165 and 170, but other embodiments may include fewer or additional components. The heat exchange member 150 at least partially resides in the bypass duct 115 of the turbojet engine 190 and in one form is configured with heat exchange sectors 195, 200, and 205. In one form the heat exchange sectors 195, 200, and 205 provide independent conduits through which the heat exchange fluid 185 may flow. The heat exchange fluid 185 may flow in the same direction across the heat exchange sectors 195, 200, and 205, or may flow in opposite directions. The heat exchange sectors 195, 200, and 205 may be defined by conduit walls 210 and 215 or any other sector-forming structure. In some applications, the conduit walls 210 and 215 may extend only partially along the length of the heat exchange member 150 thus allowing the heat exchange fluid 185 to intermix before exiting the heat exchanger 125.

In one form the intake manifold 155 is used to receive the heat exchange fluid 185 returning from a heat producing component through the heat exchanger conduit 165, and thereafter deliver the heat exchange fluid 185 to the heat exchange member 150. The intake manifold 155 can be configured to accept and separately maintain multiple streams of the heat exchange fluid from multiple heat exchange components. In some embodiments, the heat exchanger 125 does not include the intake manifold 155, rather, the heat exchange fluid 185 returning from one or more heat producing components flows directly into the heat exchange member 150 and into an independent heat exchange sector.

The exit manifold 160 may be configured to receive a relatively cool heat exchange fluid 185 and distribute it to a heat producing component. The exit manifold 160 may be configured to return the heat exchange fluid to multiple heat producing components. In other embodiments, the heat exchanger 125 does not include the exit manifold 160, rather, the heat exchange fluid 185 flows directly from the heat exchange member 150 to a heat producing component.

The heat exchanger conduits 165 and 170 are configured to convey the heat exchange fluid 185 to and from a heat producing component (not shown). The heat exchanger conduits 165 and 170 may include multiple conduits. In some non-limiting forms, the multiple conduits may be routed to and from multiple heat producing components, the conduits may be used to deliver the heat exchange fluid to multiple locations within a single heat producing component, or may be used in any other type of distraction scheme, or any type of a combination. In other embodiments, the heat exchanger conduits 165 and/or 170 have sectors that correspond to different sources and/or destinations of the heat exchange fluid 185. In one non-limiting example, multiple conduits are combined to form a single sectorized conduit.

Figure 3:
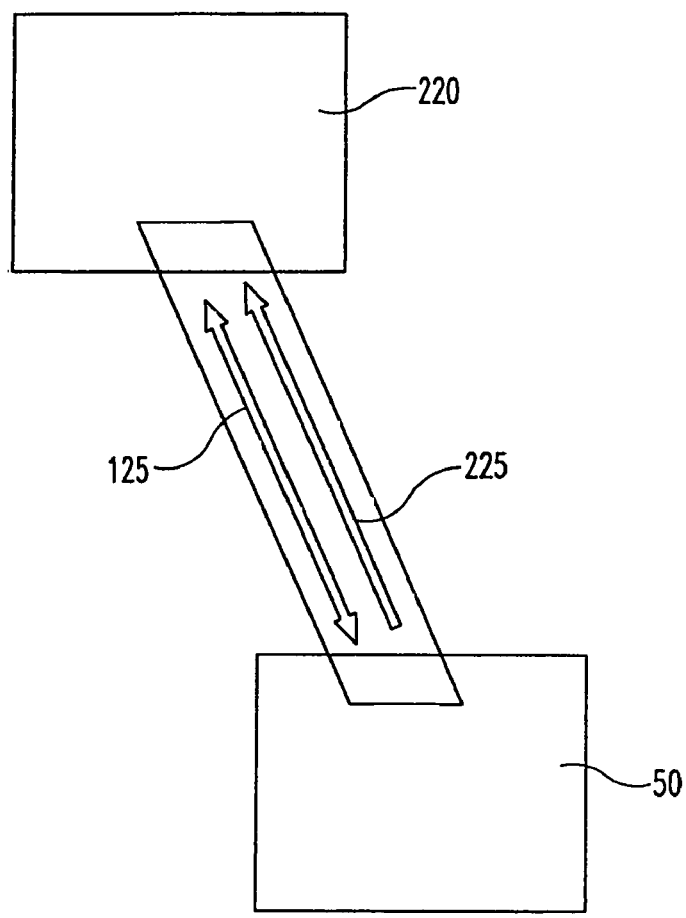
FIG. 3 is a schematic of a gas turbine engine coupled with a directed energy system.

Referring to FIG. 3, the gas turbine engine 50 is shown coupled to a directed energy weapon 220 through the heat exchanger 125 and a power conduit 225. The directed energy weapon 220 may also be referred to as a radiant energy generating device. In one form the directed energy weapon 220 may convert the electricity input from a source into a radiant electromagnetic energy output that can be directed to a target. In some applications the directed energy weapon 220 may generate a directed, radiant, electromagnetic energy output in the microwave range. In still other forms, the directed energy weapon may be based on a form of laser, such as a free electron laser, that may extend from the microwave regime to the visible light spectrum; a combination of different radiant energy generators; and/or a different type of high-level electromagnetic energy generator suitable for a variety of operations. In some forms the directed energy weapon 220 may be replaced with any variety of other components that may be provided with power and/or heat exchange capabilities. Such components may include high power electronics, among other possibilities. In some forms, the gas turbine engine 50 may be strictly used to provide electrical power and heat transfer to the directed energy weapon 220, thus requiring another source of propulsion if the directed energy weapon 220 is installed on a moving platform such as an aircraft. In other forms, however, the directed energy weapon 220 may be installed on an aircraft powered by the gas turbine engine 50 that provides both propulsion and heat transfer. For example, the directed energy weapon 220 may be installed on a watercraft, such as a naval vessel, to provide perimeter defense, in which the gas turbine engine provides both propulsion for the vessel as well as electrical power and heat dissipation.

The power conduit 225 may be used to provide power to the directed energy weapon 220. The direction of the arrow indicates that the gas turbine engine 50 provides such power to the directed energy weapon 220. The gas turbine engine 50 may provide any form of useful energy such as, but not limited to, mechanical, thermal, and/or electrical. In some forms, the gas turbine engine 50 may receive power from the directed energy weapon or other devices.

The heat exchanger 125 is shown having a double arrowhead which indicates the recirculating nature of the heat exchange fluid (not shown). For example, a relatively high temperature heat exchange fluid may be circulated from the directed energy weapon 220 through the heat exchanger 125 to lower the temperature of the heat exchange fluid before it is returned to the directed energy weapon 220 to absorb additional heat. Though the heat exchanger 125 is depicted having two arrowheads, it will be appreciated that the heat exchanger 125 may take the form of a solid heat sink in which case it may not include a recirculating heat exchange fluid.

Figure 4:
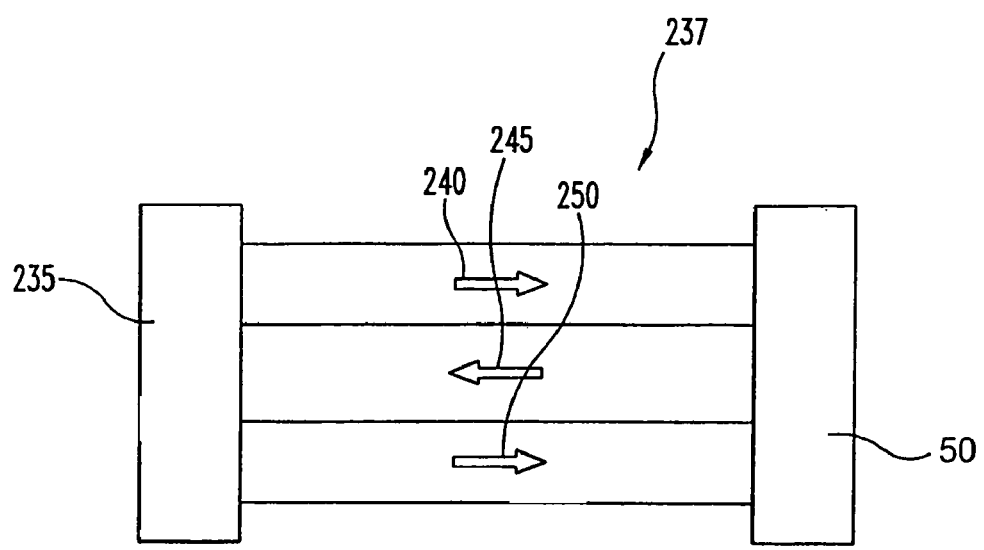
FIG. 4 is a schematic of a multi-sector heat exchanger.

FIG. 4 depicts a multi-sector heat exchanger. The gas turbine engine 50 is shown coupled to a component 235 through a multi-sector heat exchanger 237. Fluid flow direction arrows 240, 245, and 250 indicate that the fluid disposed within the multi-sector heat exchanger 237 may flow in different directions and that the multi-sector heat exchanger 237 may comprise separate compartments for each of those directions 240, 245, and 250. Though only one component 235 is depicted in FIG. 4, other components may be added in other embodiments.

One embodiment of the present invention is a heat exchanger integrated with a gas turbine engine, with the heat exchanger disposed in a bypass duct of the engine. A heat exchange fluid within the heat exchanger circulates between the heat exchanger and a heat producing component, such as, but not limited to, a directed energy weapon system.

One form of the present invention provides a gas turbine engine including a bladed rotor to receive air from an inlet, the bladed rotor being in fluid communication with a duct to supply a compressed air flow downstream of the inlet, an ejector operable to provide an ambient air flow to the duct, a first ejector stream of the ejector including the compressed air flow, and a second ejector stream of the ejector including the ambient air flow, a mixer to mix the ambient air flow and the compressed air flow together to provide a mixed air flow downstream of the inlet, and a heat exchanger located in the duct to transfer heat between the heat exchanger and the mixed air flow, the heat exchanger located downstream of the mixer.

Another form of the present invention provides a directed energy weapon including at least one heat producing component, a gas turbine engine having a duct operable to convey air, and a heat exchanger located in the duct and thermodynamically coupled with the gas turbine engine and the directed energy weapon to exchange heat with a flow stream of the gas turbine engine, the heat exchanger located in the duct.

Yet another form of the present invention provides a gas turbine engine having a bypass duct downstream of a compressor fan, a heat producing component, an ejector having a first fluid flow path through the bypass duct and a second fluid flow path, and means for ejector cooling the heat producing component.

Yet a further form of the present invention provides a method including rotating a bladed rotor, flowing a bypass flow stream downstream of the bladed rotor, pumping cooling air by an ejector action using the bypass flow stream, mixing the cooling air and the bypass flow stream to create a mixed stream, and exchanging heat between a heat exchanger and the mixed stream.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions described herein or referred by any claims that follow are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus for a heat exchange system, comprising:
    a gas turbine engine including a bladed rotor to receive air from an inlet, the bladed rotor being in fluid communication with a duct to supply a compressed air flow downstream of the inlet;
    an ejector operable to provide an ambient air flow to the duct, a first ejector stream of the ejector including the compressed air flow, and a second ejector stream of the ejector including the ambient air flow;
    a mixer to mix the ambient air flow and the compressed air flow together to provide a mixed air flow downstream of the inlet; and
    a heat exchanger located in the duct to transfer heat between the heat exchanger and the mixed air flow, the heat exchanger located downstream of the mixer.

2. The apparatus of claim 1, further comprising a working fluid disposed within the heat exchanger to accept or reject heat, the working fluid operable to be compressed and circulated through a condenser.

3. The apparatus of claim 2, wherein the working fluid is operable to flow substantially opposite in direction to the mixed air flow.

4. The apparatus of claim 1, wherein the heat exchanger includes an inlet manifold and an exit manifold, the inlet and exit manifolds operable to be coupled with heat exchange fluid conduits.

5. The apparatus of claim 1, wherein the heat exchanger is comprised of sectors operable to cool separate streams of heat exchange fluid.

6. The apparatus of claim 1, wherein the gas turbine engine is of a turbofan type, wherein the duct is a bypass duct of the turbofan, and wherein the bladed rotor is a fan of the turbofan type.

7. The apparatus of claim 1, wherein the gas turbine engine is a power source for at least one component.

8. The apparatus of claim 7, wherein the component is a directed energy weapon, the gas turbine engine operable to generate electricity to power the directed energy weapon.

9. An apparatus for a heat exchange system, comprising:
    a directed energy weapon including at least one heat producing component;
    a gas turbine engine having a duct operable to convey air; and
    a heat exchanger located in the duct and thermodynamically coupled with the gas turbine engine and the directed energy weapon to exchange heat with a flow stream of the gas turbine engine.

10. The apparatus of claim 9, wherein the flow stream is comprised of a compressed air flow and an ambient air flow.

11. The apparatus of claim 10, further comprising an ejector, the ejector operable to supply the ambient air flow to the gas turbine engine.

12. The apparatus of claim 9, further comprising a heat exchange fluid disposed within the heat exchanger and circulating to at least a portion of the directed energy weapon system.

13. The apparatus of claim 12, wherein the heat exchange fluid flows substantially opposite in direction to a compressor discharge flow path and an ejector flow path.

14. The apparatus of claim 9, wherein the gas turbine engine is of a turbofan type, wherein the duct is a bypass duct of the turbofan, and wherein the flow stream is a stream provided by a fan of the turbofan type.

15. The apparatus of claim 9, wherein an energy produced by the gas turbine engine is operable to power the directed energy weapon.

16. A method of operating a gas turbine engine with a heat exchanger, the method comprising:
    rotating a bladed rotor;
    flowing a bypass flow stream downstream of the bladed rotor;
    pumping cooling air by an ejector action using the bypass flow stream;
    mixing the cooling air and the bypass flow stream to create a mixed stream; and
    exchanging heat between a heat exchanger and the mixed stream.

17. The method of claim 16, which further includes thermodynamically coupling the heat exchanger to a directed energy weapon and a gas turbine engine.

18. The method of claim 17, which further includes:
    circulating a working fluid between the directed energy weapon and the heat exchanger; and
    cooling the directed energy weapon.

19. The method of claim 16, wherein the exchanging heat includes circulating a working fluid between a thermal component and the heat exchanger, and which further includes delivering the working fluid at or below a determined temperature to cool the thermal component.

20. The method of claim 19, which further includes splitting the working fluid to cool a plurality of thermal components.

* * * * *